US010311898B1

(12) United States Patent
Gubbins et al.

(10) Patent No.: US 10,311,898 B1
(45) Date of Patent: Jun. 4, 2019

(54) NEAR FIELD TRANSDUCERS (NFT) INCLUDING OXIDE LAYER

(71) Applicant: SEAGATE TECHNOLOGY LLC, Cupertino, CA (US)

(72) Inventors: Mark Anthony Gubbins, Donegal (IE); Peter Kevin McGeehin, Donegal (IE); Marcus Benedict Mooney, Donegal (IE); Michael James Hardy, Maghera (GB)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/391,906

(22) Filed: Dec. 28, 2016

Related U.S. Application Data

(60) Provisional application No. 62/271,496, filed on Dec. 28, 2015.

(51) Int. Cl.
*G11B 5/00* (2006.01)
*G11B 5/31* (2006.01)

(52) U.S. Cl.
CPC .......... *G11B 5/3109* (2013.01); *G11B 5/3163* (2013.01); *G11B 2005/0021* (2013.01)

(58) Field of Classification Search
CPC .. G11B 7/00; G11B 5/09; G11B 27/36; G11B 2220/20; G11B 2220/90; G11B 5/012; G11B 2005/0021
USPC ...... 360/59, 313, 328, 75; 369/13.13, 13.33, 369/13.34
See application file for complete search history.

(56) References Cited

U.S. PATENT DOCUMENTS

| 8,964,514 | B2 * | 2/2015 | Hirata | G11B 5/314 |
| | | | | 369/13.14 |
| 9,251,837 | B2 * | 2/2016 | Zhu | G11B 13/08 |

OTHER PUBLICATIONS

Gustafson et al., "Self-Limited Growth of a Thin Oxide Layer on Rh(111)", *Physical Review Letters*, vol. 92, No. 12, Mar. 26, 204, pp. 126102-1-126102-4.
Nolte et al., "Shape Changes of Supported Rh Nanaparticles During Oxidation and Reduction Cycles", *Science*, vol. 321, Sep. 19, 2008, pp. 1654-1658.

* cited by examiner

*Primary Examiner* — Nabil Z Hindi
(74) *Attorney, Agent, or Firm* — Mueting, Raasch & Gebhardt, P.A.

(57) ABSTRACT

Devices that include a near field transducer (NFT) the NFT includes a bulk of at least one plasmonic material and at least one sacrificial metal; and a surface layer that includes an oxide of the at least one sacrificial metal.

7 Claims, 2 Drawing Sheets

US 10,311,898 B1

NEAR FIELD TRANSDUCERS (NFT) INCLUDING OXIDE LAYER

PRIORITY

This application claims priority to U.S. Provisional Application No. 62/271,496 entitled, NEAR FIELD TRANSDUCERS INCLUDING OXIDE LAYERS THEREON, filed on Dec. 28, 2015, the disclosure of which is incorporated herein by reference thereto.

SUMMARY

Disclosed are devices that include a near field transducer (NFT) the NFT includes a bulk of at least one plasmonic material and at least one sacrificial metal; and a surface layer that includes an oxide of the at least one sacrificial metal.

Also disclosed are methods that include depositing a mixed material, the mixed material including at least one plasmonic material and at least one sacrificial metal; and oxidizing at least a portion of the at least one sacrificial metal to form a surface layer on the mixed material.

Also disclosed are methods that include depositing a mixed material, the mixed material including at least one plasmonic material selected from: silver (Ag), copper (Cu), or combinations thereof and at least one sacrificial metal selected from: aluminum (Al), titanium (Ti), tantalum (Ta), tungsten (W), or combinations thereof; and oxidizing at least a portion of the at least one sacrificial metal to form a surface layer comprising an oxide of the sacrificial metal on the mixed material.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Heat assisted magnetic recording (referred to through as HAMR) utilizes radiation, for example from a laser, to heat media to a temperature above its curie temperature, enabling magnetic recording. In order to deliver the radiation, e.g., a laser beam, to a small area (on the order of 20 to 50 nm for example) of the medium, a NFT is utilized. During a magnetic recording operation, the NFT absorbs energy from a laser and focuses it to a very small area; this can cause the temperature of the NFT to increase. The temperature of the NFT can be elevated up to about 400° C. or more.

Most designs for HAMR devices include NFTs made primarily of gold (Au) because gold has relatively good plasmonic materials and can withstand processing steps for manufacturing the NFT and/or surrounding structures. Other materials, such as silver (Ag), copper (Cu), or rhodium (Rh) have better plasmonic properties than Au but suffer from reliability issues such as oxidation, corrosion or combinations thereof. Therefore methods or constructions of NFTs that allow for the use of such plasmonic materials are needed.

Disclosed herein are methods of making NFTs that include depositing a sacrificial metal along with a plasmonic material and annealing the deposited material so that a layer of oxide from the sacrificial metal is formed on the plasmonic material. The oxide layer can serve to protect the plasmonic material during further processes being carried out on the NFT. The oxide layer can either be removed before fabrication of the NFT is finished or it can remain in the final device as formed. As such disclosed herein are devices that include a NFT including plasmonic material and sacrificial metal and in some embodiments an oxide layer formed from the sacrificial metal on the NFT. Also disclosed herein are NFTs that include a plasmonic material and sacrificial metal and no oxide layer thereon.

Figure 1:
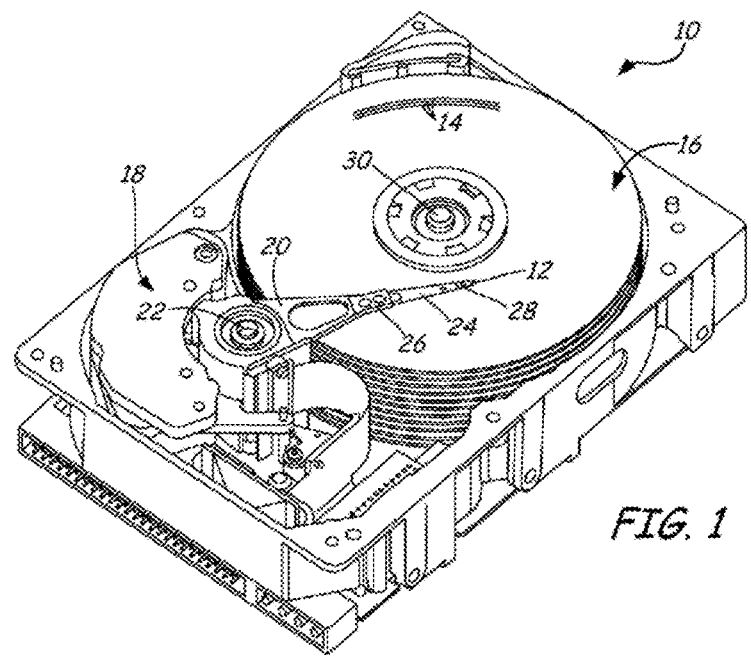
FIG. 1 is a perspective view of a magnetic disc drive that can include HAMR devices.

FIG. 1 is a perspective view of disc drive 10 including an actuation system for positioning slider 12 over track 14 of magnetic medium 16. The system depicted in FIGS. 1 and 2 can include disclosed structures and multilayer gas barrier layers. The particular configuration of disc drive 10 is shown for ease of description and is not intended to limit the scope of the present disclosure in any way. Disc drive 10 includes voice coil motor 18 arranged to rotate actuator arm 20 on a spindle around axis 22. Load beam 24 is connected to actuator arm 20 at head mounting block 26. Suspension 28 is connected to an end of load beam 24 and slider 12 is attached to suspension 28. Magnetic medium 16 rotates around an axis 30, so that the windage is encountered by slider 12 to keep it aloft a small distance above the surface of magnetic medium 16. Each track 14 of magnetic medium 16 is formatted with an array of data storage cells for storing data. Slider 12 carries a magnetic device or transducer (not shown in FIG. 1) for reading and/or writing data on tracks 14 of magnetic medium 16. The magnetic transducer utilizes additional electromagnetic energy to heat the surface of medium 16 to facilitate recording by a process termed heat assisted magnetic recording (HAMR).

Figure 2:
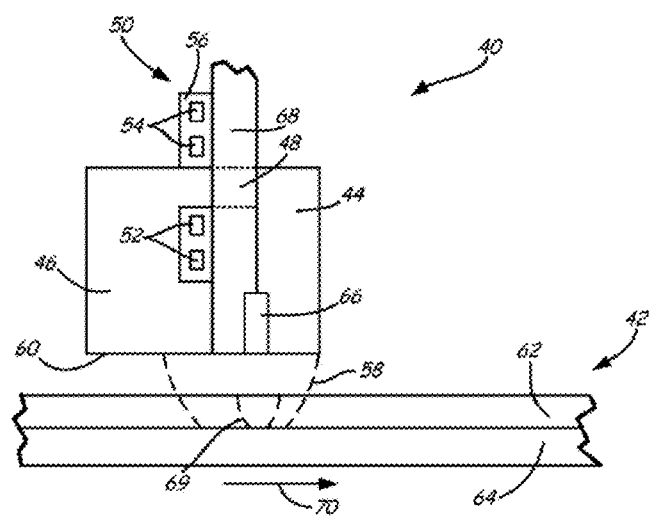
FIG. 2 is a cross sectional view of a perpendicular HAMR magnetic recording head and of an associated recording medium.

A HAMR transducer includes a magnetic writer for generating a magnetic field to write to a magnetic medium (e.g. magnetic medium 16) and an optical device to heat a portion of the magnetic medium proximate to the write field. FIG. 2 is a cross sectional view of a portion of a magnetic device, for example a HAMR magnetic device 40 and a portion of associated magnetic storage medium 42. HAMR magnetic device 40 includes write pole 44 and return pole 46 coupled by pedestal 48. Coil 50 comprising conductors 52 and 54 encircles the pedestal and is supported by an insulator 56. As shown, magnetic storage medium 42 is a perpendicular magnetic medium comprising magnetically hard storage layer 62 and soft magnetic underlayer 64 but can be other forms of media, such as patterned media. A current in the coil induces a magnetic field in the pedestal and the poles. Magnetic flux 58 exits the recording head at air bearing surface (ABS) 60 and is used to change the magnetization of portions of magnetically hard layer 62 of storage medium 42 enclosed within region 58. Near field transducer 66 is positioned adjacent the write pole 44 proximate air bearing surface 60. Near field transducer 66 is coupled to waveguide 68 that receives an electromagnetic wave from an energy source such as a laser. An electric field at the end of near field transducer 66 is used to heat a portion 69 of magnetically hard layer 62 to lower the coercivity so that the magnetic field from the write pole can affect the magnetization of the storage medium. As can be seen in FIG. 2, a portion of the near field transducer is positioned at the ABS 60 of the device.

Devices disclosed herein can also include other structures. Devices disclosed herein can be incorporated into larger devices. For example, sliders can include devices as disclosed herein. Exemplary sliders can include a slider body that has a leading edge, a trailing edge, and an air bearing surface. The write pole, read pole, optical near field transducer and contact pad (and optional heat sink) can then be located on (or in) the slider body. Such exemplary sliders can be attached to a suspension which can be incorporated into a disc drive for example. It should also be noted that disclosed devices can be utilized in systems other than disc drives such as that depicted in FIGS. 1 and 2.

Disclosed NFTs can be formed by depositing at least a plasmonic material and a sacrificial metal. The plasmonic material can include rhodium (Rh), silver (Ag), copper (Cu), or combinations thereof. All of these plasmonic materials are susceptible to oxidation because of their reactivity with oxygen, therefore inclusion of the sacrificial metal, which is more reactive towards oxygen than the plasmonic material, protects the plasmonic material from being oxidized or can at least diminish the amount of oxidation.

In some embodiments disclosed methods can include a step of depositing a mixed material, the mixed material including at least one plasmonic material and at least one sacrificial metal. The plasmonic material can include rhodium (Rh), silver (Ag), copper (Cu), or combinations thereof. The at least one sacrificial metal can include aluminum (Al), titanium (Ti), tantalum (Ta), tungsten (W), yttrium (Y), niobium (Nb), silicon (Si), chromium (Cr), zirconium (Zr), magnesium (Mg), scandium (Sc), lanthanum (La), or combinations thereof. In some embodiments the at least one sacrificial metal can include aluminum (Al), titanium (Ti), tantalum (Ta), tungsten (W), or combinations thereof.

The mixed material can be described by the amount of sacrificial metal with respect to the total material (e.g., the plasmonic material plus the sacrificial metal). In some embodiments the amount of the sacrificial metal can be described as a percentage of the total; and even more specifically in some embodiments the amount of the sacrificial metal can be described as an atomic percent (at %) of the total. In some embodiments the sacrificial metal can be not greater than 20 at % of the total, not greater than 15 at % of the total, not greater than 10 at % of the total, or not greater than 8 at % of the total. In some embodiments the sacrificial metal can be not less than 0.5 at % of the total, not less than 1 at % of the total, not less than 2 at % of the total or not less than 3 at % of the total.

The mixed material can be deposited using various processes or steps for example. One such method includes co-sputtering plasmonic material with the sacrificial metal from a single target (e.g., a composite target) or from more than one target.

Some disclosed methods can also include a step of heating or annealing the deposited mixed material. The step of annealing the mixed material can force the sacrificial metal to diffuse towards the surface of the mixed material. This can also be described as driving the sacrificial metal towards the surfaces of the deposited mixed material. In some embodiments, a method of heating the deposited material is not formed, as oxidation of the sacrificial metal will itself drive the sacrificial metal to the surface of the bulk material. In embodiments where a step of annealing is included, the step of annealing can include raising the temperature of the atmosphere surrounding the mixed material to at least 150° C., at least 180° C., at least 200° C., at least 225° C., at least 250° C., or at least 270° C. for example.

Disclosed methods can also include a step of oxidizing the sacrificial metal. In some embodiments this step can be accomplished under atmospheric conditions, e.g. a normal atmosphere that is not enriched in oxygen. In some embodiments this step can be accomplished in an oxygen enriched environment. In some embodiments, the step of oxidizing the sacrificial metal can take place at substantially the same time as the annealing step, can occur after the annealing step or both. In some embodiments disclosed methods can include a step of oxidizing the sacrificial metal at a mostly regular atmospheric oxygen environment. In some embodiments disclosed methods can include a step of oxidizing the sacrificial metal in an oxygen enriched environment.

In some embodiments, the step of oxidizing the sacrificial metal can draw more of the sacrificial metal from the bulk of the mixed material. In some embodiments the combined step of annealing and oxidizing can draw the sacrificial metal from the bulk of the mixed material and oxidize it on the surface so that the formed oxide creates a self-limiting layer of oxide on the surface of the bulk of the mixed material. This can happen because the oxide grows from the surface down into the bulk of the metal by oxygen permeating down through the initial layers of oxide. Once the oxide reaches a certain thickness, the oxygen cannot permeate any further into the metal. The oxide stops growing when or where the oxygen ceases to be present, e.g., it is a self-limiting process.

In some embodiments, the oxidation of the sacrificial metal (either simultaneous with annealing, after annealing, or both) can create an oxide layer that has a thickness of not less than about 1 Angstrom (Å), not less than 2 Å, not less than 2.5 Å, or not less than 5 Å. In some embodiments, the oxidation of the sacrificial metal (either simultaneous with annealing, after annealing, or both) can create an oxide layer that has a thickness of not greater than 100 Å, not greater than 80 Å, not greater than 75 Å, or not greater than 50 Å.

In some embodiments, the oxide layer formed on the bulk of the mixed material can be removed before fabrication of the device is finished and in some embodiments the oxide layer formed on the bulk of the mixed material can be removed before fabrication of the device is finished. Removal of the oxide layer, if desired, can be accomplished using any useful removal method, including for example etching, planarization, etc.

In some embodiments where the oxide layer or at least a portion of the oxide layer is to remain even after fabrication of the device is finished, the oxide layer could serve as part of adjacent cladding layers, serve as a barrier layer, serve as a protection layer, or any combination thereof.

Oxide layers formed from the at least one sacrificial metal can be present on any surface or surfaces of any portion of the NFT. In some embodiments not every surface of the NFT or not every surface of every portion of the NFT needs to have the oxide layer maintained even after fabrication of the device is finished. In some embodiments, at least one surface of at least one portion of the NFT can have the oxide layer removed therefrom before fabrication of the NFT is finished and at least one surface of at least one portion of the NFT can have the oxide layer maintained even after the NFT fabrication and entire device fabrication is finished.

Disclosed devices can also be fabricated using various steps including those discussed below. For example, the mixed material can be heated at relatively high temperatures (for example at least at 200° C.) and periodically oxidized. Another method includes sputtering a plasmonic material and a sacrificial metal from a composite target at relatively high temperatures (for example, at least 200° C.), periodically oxidizing and optionally heating the deposited material and metal. A particular illustrative set of steps that can be carried out to facilitate such a method can include the following. First, the plasmonic material and the sacrificial can be co-sputtered from two targets, or alternatively sputtered from a composite target. A heat treatment may optionally be utilized after, or throughout the deposition (without necessarily pausing growth) to facilitate the segregation of the sacrificial metal. Third, an oxidation treatment (e.g., radical shower, radiation, $O_2$ plasma, annealing, etc.) can be carried out to oxidize the metal to form the oxide layer.

Some disclosed embodiments include rhodium (Rh) as the plasmonic material and aluminum (Al) as the sacrificial metal. Al has a much higher oxidation tendency than does Rh (Rh has a free energy of oxide formation of −250 KJ/mole $O_2$ and Al is −1000 KJ/mole $O_2$). The oxide of aluminum, $Al_2O_3$, is self-limiting so a layer of $Al_2O_3$ is formed on the bulk of the deposited mixed material. The $Al_2O_3$ that is formed on the Rh/Al bulk can then serve as a portion of the cladding layer. In some embodiments, an RhAl intermetallic can be formed. In order to at least minimize formation of this intermetallic, optical properties of the material (e.g., n and k) can be monitored, the thermal conductivity can be monitored, or a combination thereof. Formation of the RhAl intermetallic may be able to be minimized by utilizing an oxidation process without addition of heat, for example.

In some embodiments that include silver (Ag) as a plasmonic material, an illustrative sacrificial material can include aluminum (Al). In some embodiments, the Al can be present at about 5 at % within the deposited material. When the AgAl deposited material is annealed in an oxygen environment, for example, oxidation of the Al begins with alumina growth occurring from the thin film surface into the deposited material. As the alumina growth continues into the bulk of the deposited material, oxygen cannot permeate beyond a certain distance from the film surface and in this way growth of the alumina layer on the bulk of the material is self-limiting.

Figure 3A:
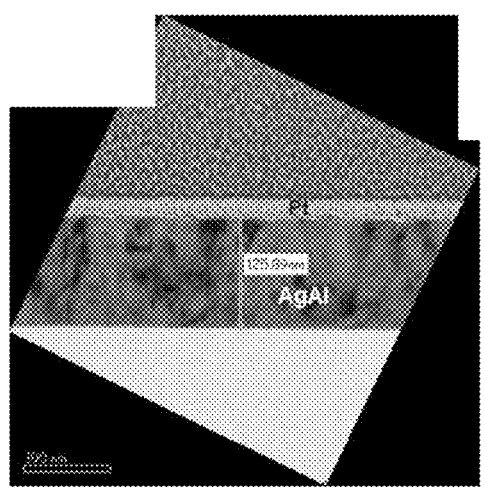
FIGS. 3A and 3B show an AgAl deposited material before (FIG. 3A) and after annealing at 275° C. for 30 minutes (FIG. 3B).
Figure 3B:
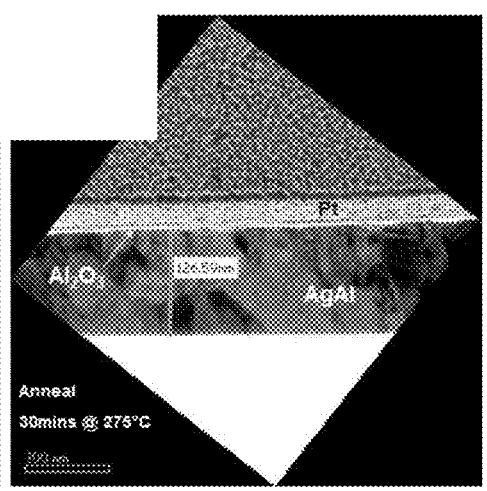

FIGS. 3A and 3B show an AgAl deposited material before (FIG. 3A) and after annealing at 275° C. for 30 minutes (FIG. 3B). Visible in FIG. 3B is a thin (about 2 nm) layer of alumina at the surface of the AgAl bulk.

In some embodiments that include copper (Cu) as a plasmonic material, an illustrative sacrificial metal can include aluminum (Al). When the CuAl deposited material is annealed in an oxygen environment, for example, oxidation of the Al begins with alumina growth occurring from the thin film surface into the deposited material. As the alumina growth continues into the bulk of the deposited material, oxygen cannot permeate beyond a certain distance from the film surface and in this way growth of the alumina layer on the bulk of the material is self-limiting. CuAl oxidizes readily when heated in an oxygen environment. The rate of copper oxidation is much faster than Al diffusion to the surface of the bulk deposited material. This would result in a thick layer of $CuO/Cu_2O$ on the surface of the bulk with a thin, non-uniform layer of $Al_2O_3$ underneath, because the formation of $Al_2O_3$ is more thermodynamically favorable than the formation of $CuO_2$ when annealing is carried out in an oxygen rich environment. Therefore, in some embodiments that include CuAl as the deposited material, an anneal is done in a reduced oxygen atmosphere. Annealing in a reduced oxygen atmosphere will induce aluminum to diffuse from the bulk towards the surface. The diffused aluminum at the surface then reacts with the $O_2$ to form an $Al_2O_3$ layer at the surface of the bulk. Because the $Al_2O_3$ layer is substantially impermeable to oxygen, no further oxidation of copper or aluminum will occur and therefore the process is self-limiting.

In some embodiments that include silver (Ag) as a plasmonic material, an illustrative sacrificial material can include tantalum (Ta). When the AgTa deposited material is annealed an in oxygen environment, oxidation of the Ta begins with TaO (tantala) growth occurring from the thin film surface into the deposited material. As the TaO growth continues into the bulk of the deposited material, oxygen cannot permeate beyond a certain distance from the film surface and in this way growth of the TaO layer on the bulk of the material is self-limiting.

In some embodiments, slider processing methods can be modified to achieve the oxide layer (e.g., alumina, tantala, etc.) at the air bearing surface (ABS). This oxide layer could then serve as the head overcoat material covering the plasmonic material (e.g., the NFT).

In some embodiments, this concept, inclusion of a more readily oxidizable metal with a plasmonic material which is less readily oxidizable could also be utilized with materials which do not have such concerns with oxidation. For example, it could be utilized with gold (Au) as the plasmonic material.

The present disclosure is illustrated by the following examples. It is to be understood that the particular examples, assumptions, modeling, and procedures are to be interpreted broadly in accordance with the scope and spirit of the disclosure as set forth herein.

As used in this specification and the appended claims, "top" and "bottom" (or other terms like "upper" and "lower") are utilized strictly for relative descriptions and do not imply any overall orientation of the article in which the described element is located.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising" and the like. For example, a conductive trace that "comprises" silver may be a conductive trace that "consists of" silver or that "consists essentially of" silver.

As used herein, "consisting essentially of," as it relates to a composition, apparatus, system, method or the like, means that the components of the composition, apparatus, system, method or the like are limited to the enumerated components and any other components that do not materially affect the basic and novel characteristic(s) of the composition, apparatus, system, method or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Use of "first," "second," etc. in the description above and the claims that follow is not intended to necessarily indicate that the enumerated number of objects are present. For example, a "second" substrate is merely intended to differentiate from another infusion device (such as a "first" substrate). Use of "first," "second," etc. in the description above and the claims that follow is also not necessarily intended to indicate that one comes earlier in time than the other.

Thus, embodiments of near field transducers (NFT) including an oxide layer are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A method comprising:
   depositing a mixed material, the mixed material comprising at least one plasmonic material selected from: silver (Ag), copper (Cu), or combinations thereof and at least one sacrificial metal selected from: aluminum (Al), titanium (Ti), tantalum (Ta), tungsten (W), or combinations thereof; and
   oxidizing at least a portion of the at least one sacrificial metal to form a surface layer comprising an oxide of the sacrificial metal on the mixed material.

2. The method according to claim 1, wherein the plasmonic material comprises silver (Ag) and the sacrificial metal comprises aluminum (Al), tantalum (Ta), or combinations thereof and the step of oxidizing at least a portion of the at least one sacrificial metal comprises annealing the deposited material in an oxygen rich environment.

3. The method according to claim 1, wherein the plasmonic material comprises copper (Cu) and the sacrificial metal comprises aluminum (Al); and the step of oxidizing at least a portion of the at least one sacrificial metal comprises annealing the deposited material in an oxygen reduced environment.

4. The method according to claim 1 further comprising removing at least a portion of the surface layer of the oxide of the sacrificial metal.

5. The method according to claim 1, wherein the step of oxidizing the sacrificial metal is accomplished by annealing the deposited material at a temperature of at least 200° C.

6. The method according to claim 1, wherein the mixed material is deposited by sputter deposition from a composite target, more than one targets, or combinations thereof.

7. The method according to claim 1, wherein the mixed material comprises not greater than 10 at % of the at least one sacrificial metal.

* * * * *